(12) United States Patent
Bianchini et al.

(10) Patent No.: US 11,433,576 B2
(45) Date of Patent: Sep. 6, 2022

(54) EQUIPMENT FOR THE PRODUCTION OF SLABS IN MINERAL GRITS BOUND WITH RESINS

(71) Applicant: SITI—B&T GROUP S.P.A., Formigine (IT)

(72) Inventors: Alessandro Bianchini, Formigine (IT); Francesco Scaramuzzi, Formigine (IT)

(73) Assignee: SITI—B&T Group S.p.A., Formigine (IT)

( * ) Notice: Subject to any disclaimer, the term of this patent is extended or adjusted under 35 U.S.C. 154(b) by 373 days.

(21) Appl. No.: 16/608,752

(22) PCT Filed: Apr. 27, 2018

(86) PCT No.: PCT/IB2018/052944
§ 371 (c)(1),
(2) Date: Oct. 25, 2019

(87) PCT Pub. No.: WO2018/198088
PCT Pub. Date: Nov. 1, 2018

(65) Prior Publication Data
US 2020/0094448 A1    Mar. 26, 2020

(30) Foreign Application Priority Data

Apr. 27, 2017    (IT) .................. 102017000046034

(51) Int. Cl.
*B29C 43/56*        (2006.01)
*B29C 51/10*        (2006.01)
(Continued)

(52) U.S. Cl.
CPC .............. *B29C 43/56* (2013.01); *B29C 51/10* (2013.01); *B28B 3/022* (2013.01);
(Continued)

(58) Field of Classification Search
CPC ... B30B 11/022; B30B 15/0017; B28B 3/022; B29C 67/244; B29C 2791/006;
(Continued)

(56) References Cited

U.S. PATENT DOCUMENTS 3,712,785 A * 1/1973 Hirt .................. C04B 35/528
264/102
3,784,343 A    1/1974 Iwasaki
(Continued)

FOREIGN PATENT DOCUMENTS

| DE | 4140012 A1 | 6/1992 | |
| EP | 1262295 A2 | 12/2002 | |
| EP | 3581295 A1 * | 12/2019 | ............... B22C 9/10 |

*Primary Examiner* — Atul P. Khare
(74) *Attorney, Agent, or Firm* — David B. Tingey; Bryant J. Keller; Kirton McConkie

(57) ABSTRACT

The equipment for the production of slabs in mineral grits bound with resins, comprises: a support frame, at least one lower plate, locked together with the frame, comprising at least one positioning zone for at least one mold having at least one forming cavity, open at the top, to contain a mix comprising the materials necessary to obtain the slabs, at least one pressing assembly comprising an upper plate movable, with respect to the frame, from an upper position of loading/unloading the mold in/from the positioning zone, to a lower position of pressing the mix inside said forming cavity, vibrating means associated at least with the lower plate, and an airtight chamber, communicating with suction means, adapted to reduce the pressure to a value lower than the atmospheric pressure, containing the mold, where the chamber is interposed between the lower plate and an upper closing element opposite the lower plate.

14 Claims, 10 Drawing Sheets

(51) Int. Cl.
 B29C 67/24 (2006.01)
 B29C 43/36 (2006.01)
 B28B 3/02 (2006.01)
 B30B 15/00 (2006.01)
 B30B 11/02 (2006.01)
 B29C 43/32 (2006.01)
 B29K 503/08 (2006.01)

(52) U.S. Cl.
 CPC ........ *B29C 43/3607* (2013.01); *B29C 67/244* (2013.01); *B29C 2043/3266* (2013.01); *B29C 2043/561* (2013.01); *B29C 2043/563* (2013.01); *B29C 2791/006* (2013.01); *B29C 2791/007* (2013.01); *B29C 2791/008* (2013.01); *B29K 2503/08* (2013.01); *B30B 11/022* (2013.01); *B30B 15/0017* (2013.01); *B30B 15/0076* (2013.01)

(58) Field of Classification Search
 CPC ...... B29C 2791/008; B29C 2043/3266; B29C 2043/561; B29C 2043/563; B29K 2503/08
 See application file for complete search history.

(56) References Cited

U.S. PATENT DOCUMENTS

| | | | |
|---|---|---|---|
| 9,221,191 B2 * | 12/2015 | Banus | B28B 3/022 |
| 10,821,628 B2 * | 11/2020 | Toncelli | B28B 3/022 |
| 2013/0136819 A1 * | 5/2013 | Toncelli | B30B 11/022 |
| | | | 425/432 |
| 2015/0314475 A1 | 11/2015 | Banus | |

* cited by examiner

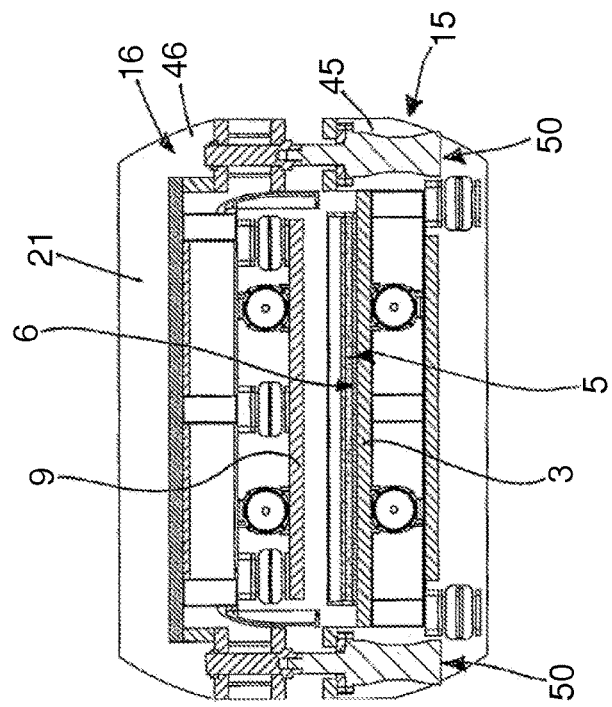
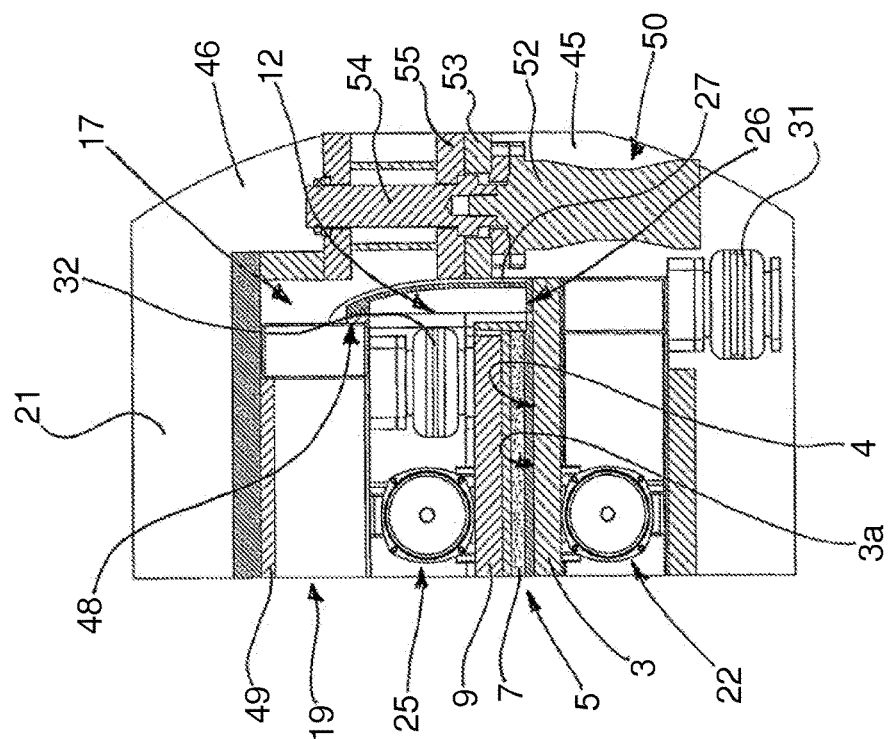

EQUIPMENT FOR THE PRODUCTION OF SLABS IN MINERAL GRITS BOUND WITH RESINS

TECHNICAL FIELD

The present invention relates to a piece of equipment for the production of slabs in mineral grits bound with resins.

More specifically, the present invention relates to a piece of equipment for the production of slabs in mineral grit bound with resins by means of a pressing technique with vibration and in a depressurized environment.

BACKGROUND ART

In some production sectors, such as construction and furnishing, but not only in these, mineral grit slabs bound with resins are widely used today.

As far as their aesthetic and functional characteristics are concerned, these slabs are completely comparable to the slabs made directly from natural materials such as marble, granite or the like.

In comparison to the latter, however, mineral grit slabs bound with resins also have other important advantages.

In the first place, they can be produced in many variants characterized by colors and/or designs and/or aesthetic effects not obtainable using the natural materials mentioned above: in other words, their production is more versatile and customizable to meet customer requirements.

Another advantage is that, since the material obtained is less porous than, for example, marble, it is unassailable by the most commonly used liquids; moreover, it is more resistant to stains.

For these reasons, these slabs are widely used, for example, in the construction of worktops for kitchen, bathrooms, or other similar applications.

These slabs (which in the rest of the description we shall also call agglomerate slabs for the sake of simplicity) are produced from a mix typically comprising minerals in granular form (e.g. marble, granite, glass, fragments of mirrors, and/or others) as well as quartz powder and, of course, resins that act as binders. Once prepared, this mix is deposited inside a mold, in which the forming cavity is of the size of the object to be obtained (excepting any shrinkage that can occur in the subsequent production phases).

The mold, thus prepared, is then introduced into a forming appliance where the mix is pressed into the cavity, and at the same time undergoes a vibrating action, with appropriate characteristics, which facilitates the compaction of the materials that make up the mix.

In addition to this, slab molding is envisaged in a depressurized environment, i.e. at a pressure lower than atmospheric pressure: in fact, the elimination of air from the molding area further promotes the compaction of the mix materials.

At present, therefore, to obtain the above-described effects, the equipment of known type comprises a pressing assembly which consists of a lower vibrating table, on which the mold is deposited, and an upper plate, which carries out the pressing of the mix.

The pressing assembly is housed in a chamber, airtight with respect to the external environment, which is brought to a pressure lower than atmospheric pressure, precisely in order to facilitate the compaction of the materials that make up the mix.

The equipment described above has been developed to make slabs that can even have surface areas of several square meters, precisely to obtain objects that can be used in the construction or furnishing sector.

For this reason, the pressing assembly can reach a considerable size, and consequently this also applies to the depressurized chamber which encloses it.

This chamber can be shaped, e.g., like a cylindrical tank in which the entire pressing assembly is contained.

In practice, it has been observed that this solution can be satisfactory, both from the point of view of the product quality results and from the point of view of costs, for the production of relatively small slabs.

In fact, in this case both the pressing assembly and, consequently, the depressurized chamber are of limited dimensions: this means that the desired pressure value inside the aforementioned chamber can be obtained in a relatively short time, compatible with the remaining phases of the production process.

As far as larger slabs are concerned, the time needed to obtain the desired air pressure value inside the chamber can be too long compared to the other production phases, or to achieve shorter times the use may be required of high-power vacuum creation units.

For this reason, the use of this type of equipment can be decidedly inconvenient to make large slabs, from the economic point of view, both because of the cost of the plant and of the running costs.

The fact should also be underlined that the equipment described above, sized to also make large slabs, is very heavy, cumbersome and complex and laborious to install: often, therefore, slab manufacturers do not have enough space to install it.

Moreover, the fact that the pressing assembly is entirely housed inside the depressurized chamber constitutes a considerable complication from the point of view of the flow of the products inside the line: in fact, in the chamber itself there must be some passage openings through which the molds enter coming from the preparation station of the mix of materials, or exit to undergo the subsequent production phases (typically, at least one kiln firing phase).

DESCRIPTION OF THE INVENTION

The technical aim of the present invention is to improve the state of the art in the field of equipment for the production of slabs in mineral grits bound with resins.

Within the scope of this technical aim, one object of the present invention is to provide a piece of equipment for the production of slabs in mineral grits bound with resins which allows also producing large items with competitive production times and costs.

Another object of the present invention is to provide a piece of equipment for the production of slabs in mineral grits bound with resins having a smaller size and weight than conventional equipment.

Another object of the present invention is to provide a piece of equipment for the production of slabs in mineral grits bound with resins which is constructively and functionally simpler than conventional equipment.

This aim and these objects are all achieved by a piece of equipment for the production of slabs in mineral grits bound with resins according to claim 1.

The equipment comprises a support frame, and at least a lower plate locked together with the frame provided with at least one positioning zone for at least one mold; this mold has at least one forming cavity, open at the top, for containing a mix comprising the materials necessary for obtaining the slabs. Moreover, the equipment comprises at least one pressing assembly provided with an upper plate movable, with respect to the frame, from an upper position of loading/ unloading the mold in/from the positioning zone, to a lower position of pressing the mix inside of the aforesaid forming cavity.

The equipment also comprises vibrating means associated at least with the lower plate.

The equipment also comprises an airtight chamber, communicating with suction means adapted to reduce the pressure to a value lower than atmospheric pressure; the mold is contained within this chamber.

According to one aspect of the invention, the airtight chamber is interposed between the lower plate and an upper closing element opposite said lower plate. This expedient allows considerably reducing the time required to obtain the desired vacuum inside the airtight chamber, with positive advantages on production times and costs.

The dependent claims refer to preferred and advantageous embodiments of the invention.

BRIEF DESCRIPTION OF THE DRAWINGS

Further characteristics and advantages of the present invention will become more evident from the detailed description of some preferred but not exclusive embodiments of a piece of equipment for the production of slabs in mineral grits bound with resins, illustrated by way of non-limiting example in the following attached drawings wherein:

FIG. 17 is a detail of FIG. 15;

FIG. 18 is a cross-section of the equipment of FIG. 13 taken along the XV-XV plane of FIG. 14, with the upper plate in the upper position to allow taking the mold out;

EMBODIMENTS OF THE INVENTION

Figure 1:
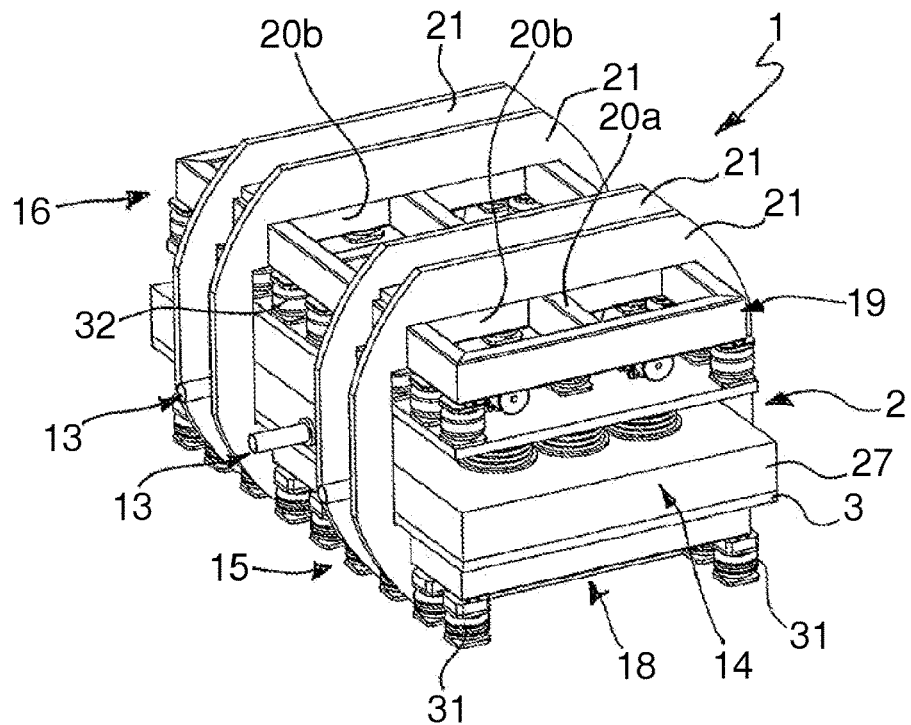
FIG. 1 is an axonometric view of the equipment according to the invention.
Figure 2:
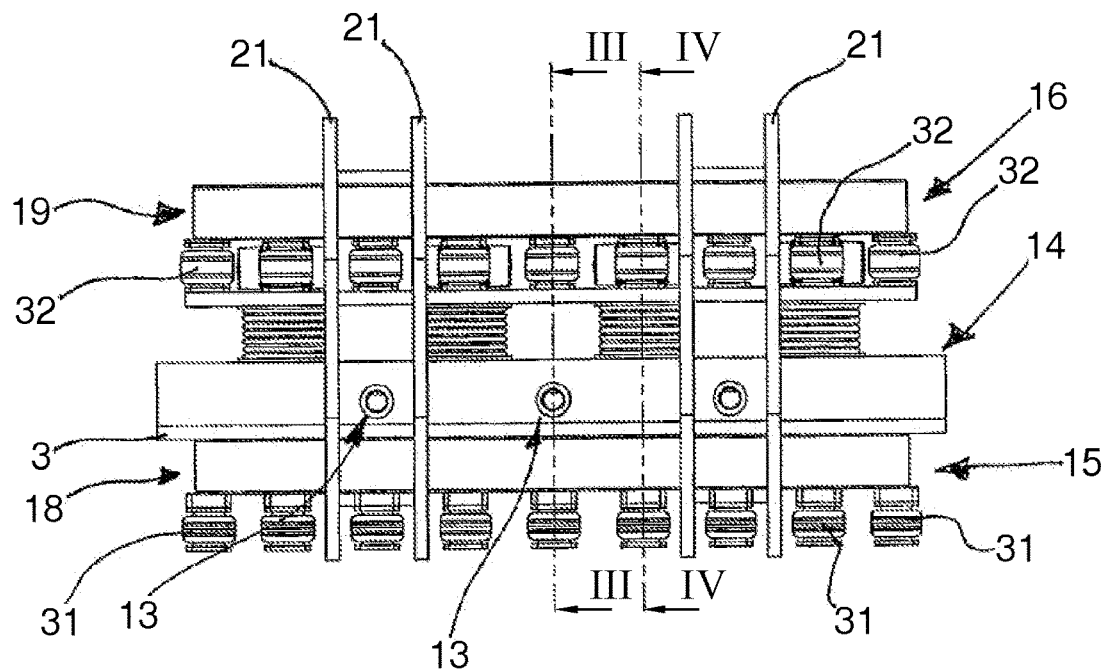
FIG. 2 is a side view of the equipment of FIG. 1.

With reference to the attached figures, reference numeral 1 globally indicates a piece of equipment for the production of slabs in mineral grits bound with resins, according to the present invention.

By way of example only, but without limitation, it should be noticed that the mineral grits used to make the slabs may comprise—to mention the most commonly used—marble, granite, quartz or any other material with suitable characteristics.

The resins, on the other hand, can, e.g., but not exclusively, be of the thermosetting type, especially for certain applications in the construction and furnishing trade.

The characteristics of the materials with which the slabs could be made, in any case, do not in any way constitute a limitation to the objects of this invention. The equipment 1 comprises a support frame 2.

Furthermore, the equipment 1 shall comprise at least one lower plate 3.

The lower plate 3 is locked together with the frame 2; the lower plate 3 comprises an upper surface 3a, which in turn defines at least one positioning zone 4 for at least one mold, generally indicated by 5.

The mold 5 comprises at least one forming cavity 6, open at the top, which is intended to contain a mix 7 comprising the materials necessary to obtain the slabs (mineral grits, resins, and possibly others).

Furthermore, the equipment 1 comprises at least one pressing assembly, generally indicated by 8, for pressing the mix 7 contained in the forming cavity 6.

The pressing assembly 8 comprises an upper plate 9.

The upper plate 9 is movable, with respect to the frame 2, from an upper position of loading/unloading the mold 5 in/from the positioning zone 4 to a lower position of pressing the mix 7 inside the forming cavity 6, as better explained below.

The pressing assembly 8 comprises actuator means, not shown in the illustrations, which control the upper plate 9 in such a way that it applies—in the above lower position—the desired pressure on the mix 7 of materials inside the forming cavity 6.

The actuator means can be of the hydraulic type or other type.

The equipment 1 comprises vibrating means 10, 11.

The vibrating means 10, 11 are associated with at least the lower plate 3. The equipment 1 also comprises an airtight chamber 12; the chamber 12 contains at least the mold 5.

The chamber 12 communicates with the suction means, generally indicated by reference numeral 13; the suction means 13 are adapted to reduce the pressure—inside the aforementioned chamber 12—to a value lower than the atmospheric pressure.

According to one aspect of the invention, the airtight chamber 12 is interposed between the lower plate 3 and an upper closing element 14, opposite the lower plate 3.

Thanks to this expedient, the airtight chamber 12 has a very reduced volume, and in any case considerably lower than that of the equipments of known type;

this allows reducing the air pressure inside the chamber 12 to the desired value in a short time and at low costs, which translate into a better performance of the equipment 1, especially in the production of large slabs.

In greater detail, the frame 2 comprises a lower portion 15, with which the above lower plate 3 is locked together.

Furthermore, the frame 2 comprises an upper portion 16; the upper portion 16 is associated with the lower portion 15 in such a way as to define, between them, an internal volume 17, in which the airtight chamber 12 is housed.

The lower portion 15 comprises, in turn, a first platform 18, which serves as a support structure for the lower plate 3.

The upper portion 16 comprises a second platform 19, which supports the pressing assembly 8 with its upper plate 9.

The first platform 18 and the second platform 19 are constructively identical, or at least very similar as regards their main characteristics.

In fact, both the first platform 18 and the second platform 19 comprise a respective perimeter structure 20, inside which are envisaged a central beam 20a and crosspieces 20b.

Therefore, the platforms 18, 19 both have a conformation substantially similar to a grid, for the reasons which will be clarified later.

The lower portion 15 and the upper portion 16 are connected to each other by means of a series of annular elements 21.

For example, in the embodiment shown in the illustrations, four annular elements 21 are envisaged, grouped into two pairs.

The number and/or arrangement of the annular elements 21 may be any.

In the embodiment shown in the illustrations, the equipment 1 has a substantially rectangular layout, when viewed in plan, which corresponds to the sizes of the most frequently produced slabs.

Conventionally, therefore (and only for the purpose of better understanding), it is possible to define a front side and a rear side of the equipment, corresponding to the short sides of same.

With reference, for example, to FIG. 1, the internal volume 17 of the frame 2 is fully accessible from the front and rear side of the equipment 1 but not from the sides: this means that—as will be seen later—it is possible to load the mold 5 in the positioning zone 4, or unload it from same, from one of the aforementioned front and rear sides of the equipment 1.

The equipment 1 comprises the first vibrating means 22, associated with the lower plate 3.

More in detail, the first vibrating means 22 are fixed to the lower surface of the lower plate 3.

The first vibrating means 22 comprise a plurality of first motor vibrators 22a; by way of example only, eight first motor vibrators 22a are fixed to the lower surface of the lower plate 3.

Figure 4:
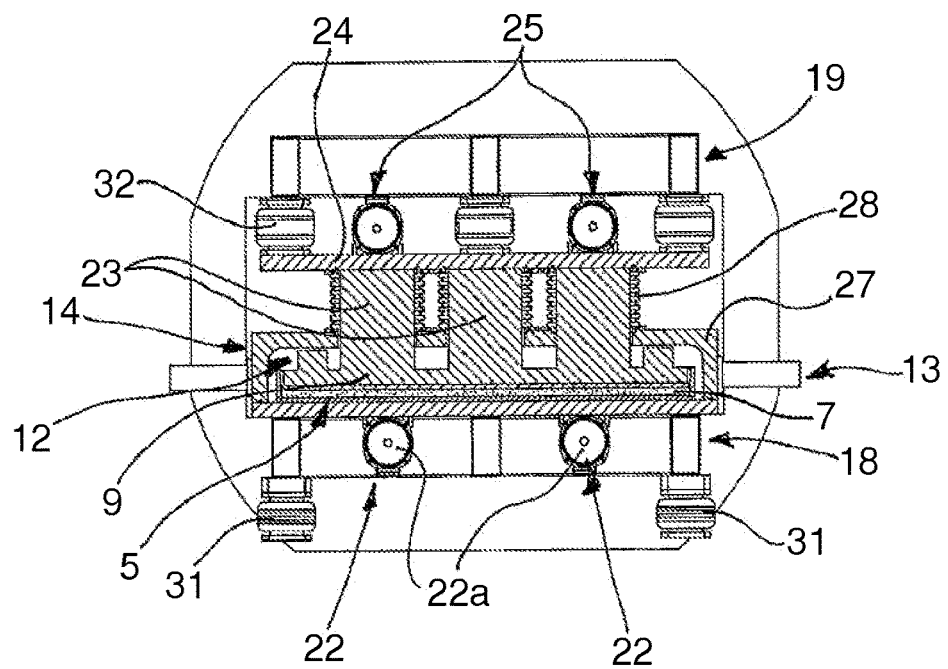
FIG. 4 is a cross-section of the equipment taken along the plane IV-IV of FIG. 2.

As shown, for example, in FIG. 4, the first motor vibrators 22a are housed in the spaces between the central beam 20a and the crosspieces 20b of the first platform 18.

The number and/or positioning of the first motor vibrators 22a may also differ from that described: e.g., these characteristics may be changed according to the changes in the dimensions of the slabs to be produced.

First vibrating means 22 of a type different from the motor vibrators could also be used.

The pressing assembly 8 comprises a plurality of upper appendages 23, which depart from the upper plate 9.

Furthermore, the pressing assembly 8 comprises a table 24, fixed on the upper appendages 23.

According to another aspect of the invention, the equipment 1 also comprises second vibrating means 25; the second vibrating means 25 are mechanically associated with the pressing assembly 8.

The presence of the second vibrating means 25 further facilitates the action of compacting the materials contained in the forming cavity 6 of the mold 5: this determines an increase in speed in the execution of such production phase, and also an improvement in the quality of the products obtained.

The second vibrating means 25 comprise second motor vibrators 25a, fixed on the table 24.

In this case as well, by way of example only, the pressing assembly 8 comprises eight second motor vibrators 25a, housed in the spaces comprised between the central beam 20a and the crosspieces 20b of the second platform 19.

According to another aspect of the invention, the upper closing element 14 comprises perimeter sealing means 26 on the upper surface 3a of the lower plate 3, so as to define the airtight chamber 12 inside which the slabs are formed.

According to yet another aspect of the invention, the upper closing element 14 comprises at least one bell-shaped body 27.

The bell-shaped body 27 is contained in the internal volume 17, with concavity, during use, facing downwards.

The bell-shaped body 27 is associated sliding with the upper appendages 23 of the pressing assembly 8; in other words, in the bell-shaped body 27 are provided openings 27a through which the upper appendages 23 pass.

In the embodiment shown, the upper appendages 23 have a cylindrical shape; consequently, the openings 27a of the bell-shaped body 27 are circular.

However, in other embodiments the upper appendages 23 and consequently the openings 27a of the bell-shaped body 27 may have a different shape.

The number of upper appendages 23 (and openings 27a), as well as their arrangement with respect to the upper plate 9, may be any in relation to, for example, the dimensions of the plates to be produced, or other production parameters.

The pressing assembly 8 comprises a plurality of armored bellows 28, which are respectively fitted along the upper appendages 23; the armored bellows 28 are interposed between the upper face of the bell-shaped body 27 and the lower face of the table 24.

The armored bellows 28 are essentially cylindrical in shape, and are of the anti-collapse type.

The perimeter sealing means 26 comprise at least one gasket 26a, housed in a respective groove obtained in the lower edge 276 of the bell-shaped body 27. The gasket 26a can be of any shape and size.

The suction means 13 comprise a plurality of suction holes 29 provided in the bell-shaped body 27, and a plurality of respective ducts 29a communicating with the aforementioned suction holes 29.

The ducts 29a are, in turn, communicating with a depressor, not shown in the illustrations (e.g. a vacuum pump, or another similar device).

The suction holes 29 are arranged along the sides of the bell-shaped body 27; they are provided along the long sides of the equipment 1, so as not to interfere with the loading/unloading operations of the mold 5.

Figure 5:
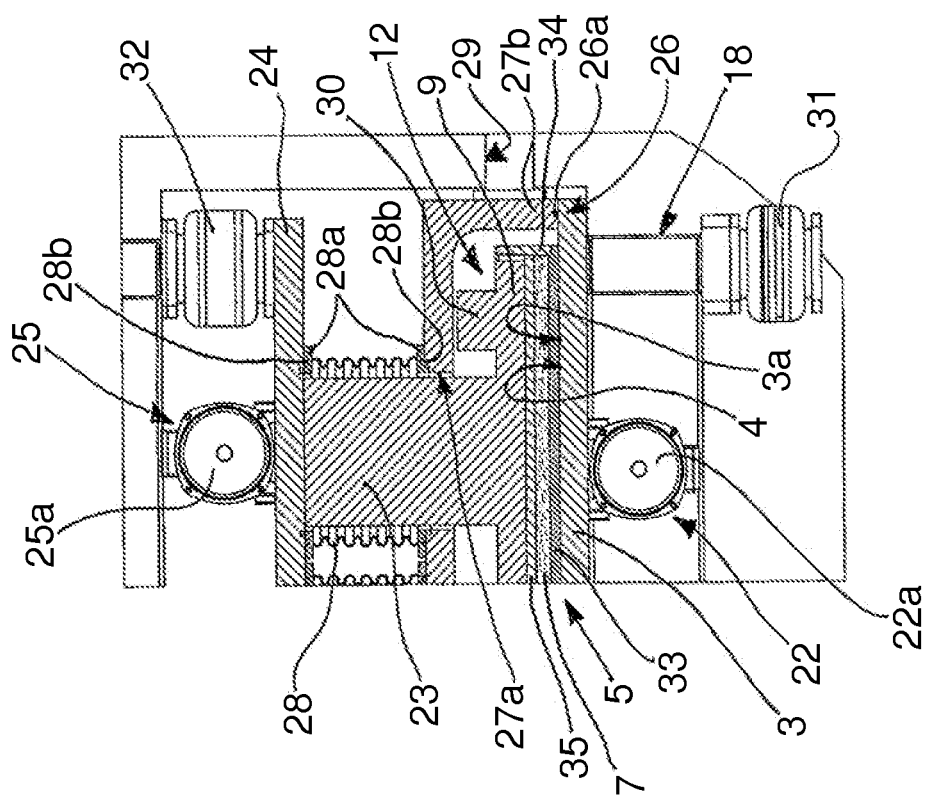
FIG. 5 is a detail of FIG. 4.
Figure 7:
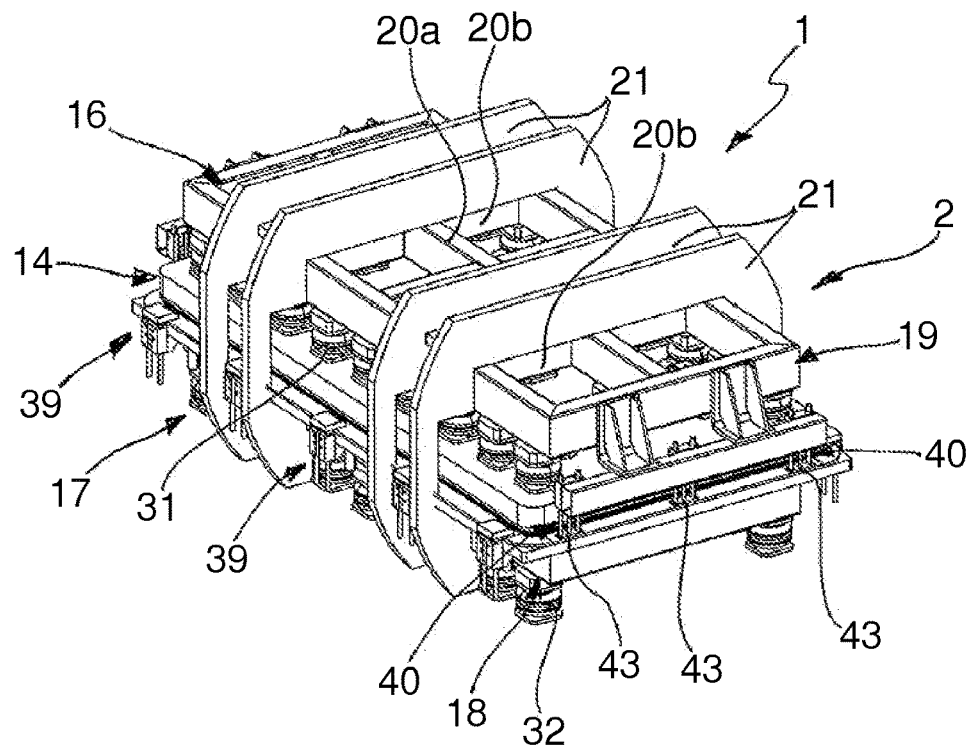
FIG. 7 is an axonometric view of another embodiment of the equipment according to the invention.
Figure 8:
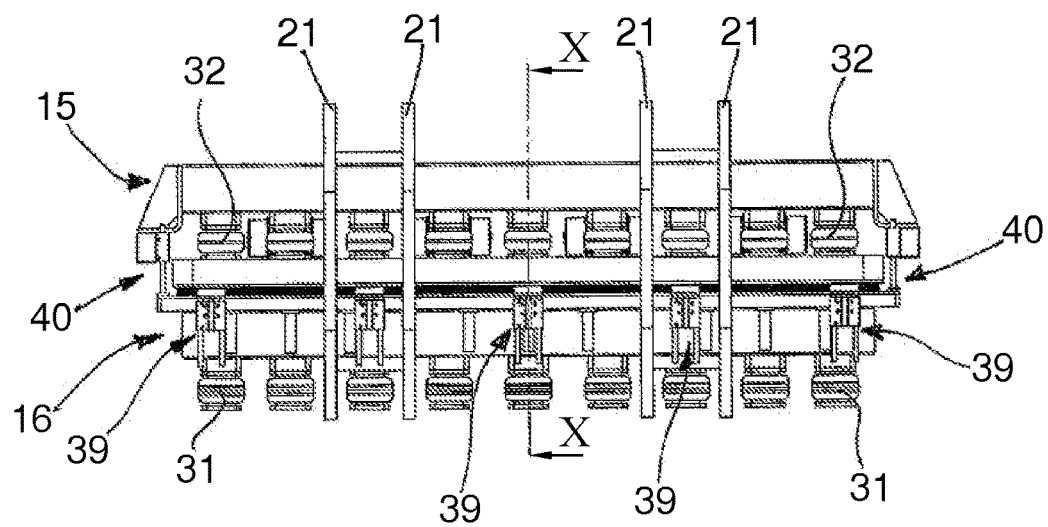
FIG. 8 is a side view of the equipment of FIG. 7.
Figure 9:
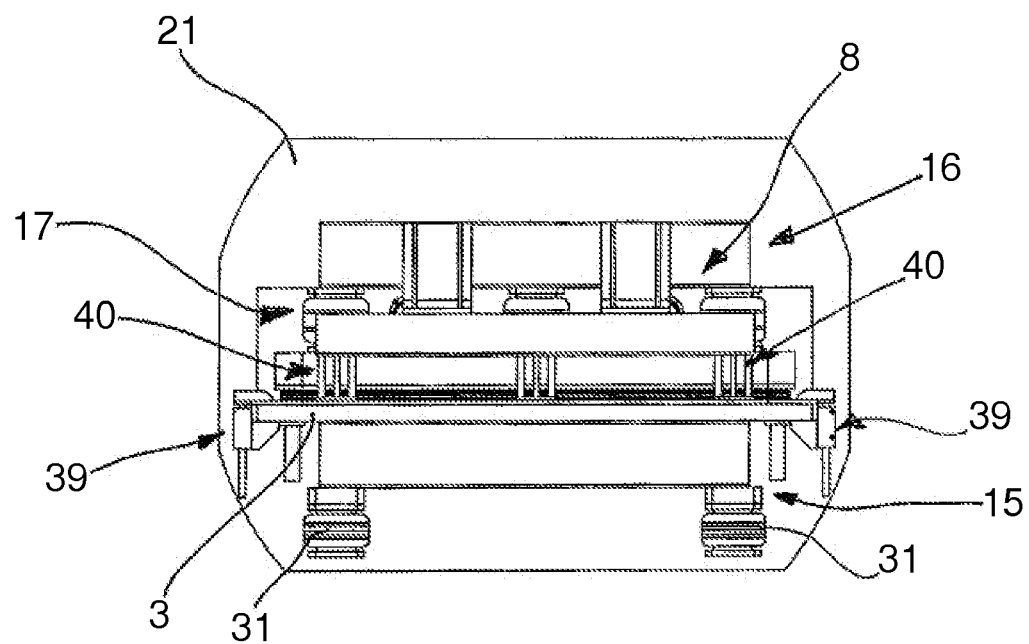
FIG. 9 is a front view of the equipment of FIG. 7.

With particular reference to FIG. 5, the armored bellows 28 are provided with respective end flanges 28a equipped with respective sealing gaskets 28b. Therefore, in practice, the airtight chamber 12 is in fluid communication with the internal volumes of the armored bellows 28; the latter, being of the anti-collapse type, do not deform due to the vacuum which is created inside the chamber 12 itself.

The bell-shaped body 27 is substantially shaped like a parallelepiped, with the opening, in use, facing downwards, but it could have any other suitable conformation.

The upper face of the lower plate 3 has a number of reliefs 30, the purpose of which is to determine the lifting of the bell-shaped body 27 to allow the operations of loading/unloading the mold 5.

The reliefs 30 can extend for the entire length of the lower plate 3, or they can be limited only to some zones of the upper face of same.

In the embodiment shown, the reliefs 30 have a quadrangular cross-section, but their cross-section could also have a different shape.

The equipment 1 comprises a number of first damping elements 31, associated with the lower portion 15 of the frame 2.

The first damping elements 31 are adapted to absorb the vibrations generated by the equipment 1, so as to prevent these from being transferred to the ground.

The first damping elements 31 can be made, e.g., of air springs or other parts having the same characteristics.

The first damping elements 31 are fixed below the long sides of the first platform 18, i.e. those arranged along the sides of the equipment 1.

The number and way of distribution of the first damping elements 31 below the first platform 18 can be any, depending on the specific application requirements.

The equipment 1 also comprises second damping elements 32; the second damping elements 32 are placed between the upper portion 16 of the frame 2 and the pressing assembly 8.

The second damping elements 32 are adapted to absorb the vibrations generated by the second vibrating means 25, so as to prevent these from being transferred to the upper portion 16 of the frame 2.

The second damping elements 32 can be made, e.g., of air springs or other parts having the same characteristics.

The second damping elements 32 are placed between the upper plate 9 and the second platform 19.

They are fixed below the long sides of the second platform 19; furthermore, some of the second damping elements 32 are fixed below the central beam 20 of the second platform 19.

The number and way of distribution of the second damping elements 32 below the second platform 19 can be any.

The mold 5 comprises a base 33 from which lateral walls 34 stand up, which define the aforesaid forming cavity 6.

The mold 5 also comprises a cover plate 35 of the forming cavity 6, which rests on the mix 7 once this has been deposited in the cavity 6 itself, and prevents direct contact of the materials with the upper plate 9.

The operation of the equipment 1 according to the invention is, in the light of what has been described, completely intuitive.

Once the mold 5 is prepared with the mix 7 of materials needed to make the slab, with the relative cover plate 35, the mold 5 itself is loaded in the positioning zone 4 of the equipment 1.

Figure 6:
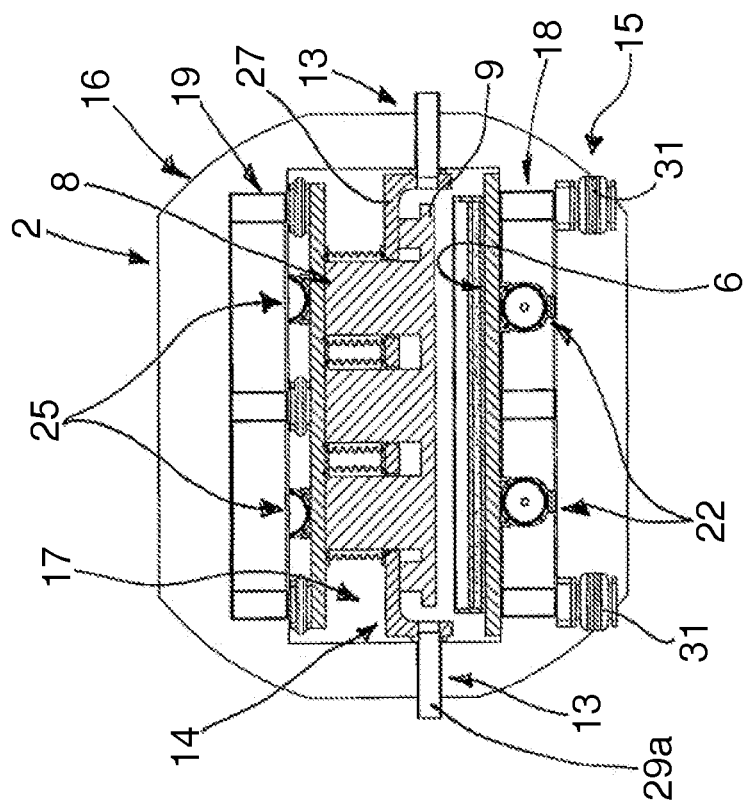
FIG. 6 is a cross-section of the equipment taken along the plane III-III of FIG. 2, with the upper plate in the upper position to allow the removal of the mold.

To do this, the upper plate 9 is moved to the upper position shown in FIG. 6. In its lifting motion to reach the above-mentioned upper position, the upper plate 9 also pulls the bell-shaped body 27 with it, inasmuch as the reliefs 30 are brought into contact against its lower face.

In the upper position shown in FIG. 6, below the upper plate 9, sufficient space is created to place the mold 5 in the positioning zone 4, by inserting it from the front or rear side of the equipment 1.

Figure 3:
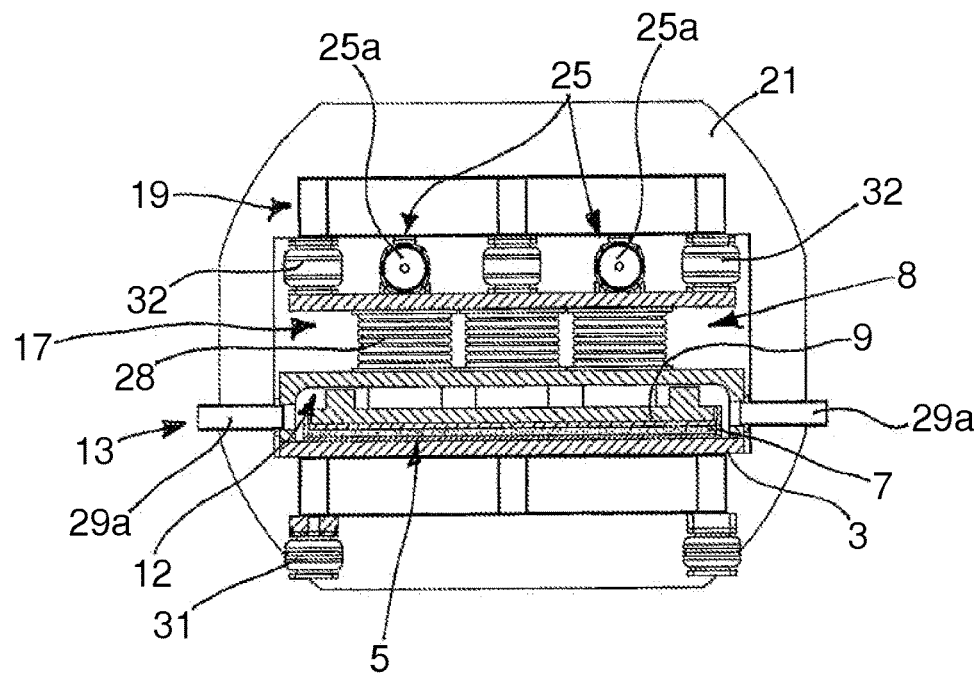
FIG. 3 is a cross-section of the equipment taken along the plane III-III of FIG. 2.

Once the mold 5 is correctly positioned, the upper plate 9 is moved to the lower position shown in FIGS. 3, 4, i.e. to the pressing position.

In this position, the upper plate 9 rests on the cover plate 35 of the mold 5 and applies an appropriate pressure on it, to determine the compaction of the materials constituting the mix 7.

Furthermore, in this position, the gasket 26a, as well as the armored bellows 28, insulate the chamber 12 from the surrounding environment.

Simultaneously with the application of a pressure on the upper plate 9, the suction means 13 are activated, in order to reduce the pressure inside the chamber 12 to the desired value.

As a non-exhaustive example, an absolute pressure of approx. 25 millibars, i.e. approx. 25 hPa, can be achieved inside the chamber 12.

According to the invention, the very small volume of the chamber 12 permits achieving very low absolute pressure values very quickly, which is a considerable advantage from a production point of view.

In fact, thanks to this expedient, the production times and costs of each single slab are significantly reduced compared to current production technologies. Furthermore, the first vibrating means 22 and the second vibrating means 25 are also operated simultaneously or at different times.

The combined action of the pressing assembly 8, of the suction means 13, and of the first and second vibrating means 22 and 25 results in an optimum and rapid compaction of the materials of the mix 7.

At the end of this phase, the upper plate 9 is lifted into the upper position (FIG. 6), and the mold 5 can be easily removed from the positioning zone 4, before being sent to the subsequent production stations.

The cycle resumes with a subsequent mold 5 introduced into the equipment 1. Another embodiment of the equipment 1 according to the invention is shown in the FIGS. 7-12.

Unless otherwise described, and as shown in the drawing tables, this embodiment comprises all the characteristics of the previous embodiments.

In this embodiment, the equipment 1 comprises a frame 2 which has a conformation identical to that described for the preceding embodiment.

The main differences concern the conformation of the pressing assembly 8 and of the upper closing element 14.

In fact, in this embodiment, and as better described below, the upper closing element 14 comprises the perimeter edge 36 of the upper plate 9, which extends outside the perimeter of the mold 5, or of the positioning zone 4.

More in detail, the upper plate 9 and the upper closing element 14 are made of a single body, essentially parallelepiped in shape, which comprises a perimeter edge 36 which extends outside the perimeter of the mold 5 or of the positioning zone 4.

The second vibrating means 25 are fixed directly to the upper face of the upper plate 9.

In this embodiment, the perimeter sealing means 26 comprise an armored bellows 37, connected to the perimeter edge 36 of the upper plate 9.

Furthermore, the perimeter sealing means 26 comprise a surround element 38, which is in turn connected to the armored bellows 37.

The surround element 38 is adapted to abut and seal on the upper surface 3a of the lower plate 3.

The surround element 38 comprises a seal gasket 38a housed in a respective groove.

According to one aspect of the invention, the perimeter sealing means 26 comprise a plurality of locking actuators 39 and 40, adapted to keep the surround element 38 abutted and sealed on the upper surface 3a of the lower plate 3.

The locking actuators 39 and 40 are arranged along the perimeter of the surround element 38.

In the embodiment shown in the illustrations, the locking actuators 39 and 40 are of the pneumatically operated type.

More specifically, first locking actuators 39 are provided arranged along the long sides of the surround element 38, and second locking actuators 40 arranged along the short sides of the same surround element 38.

Figure 11:
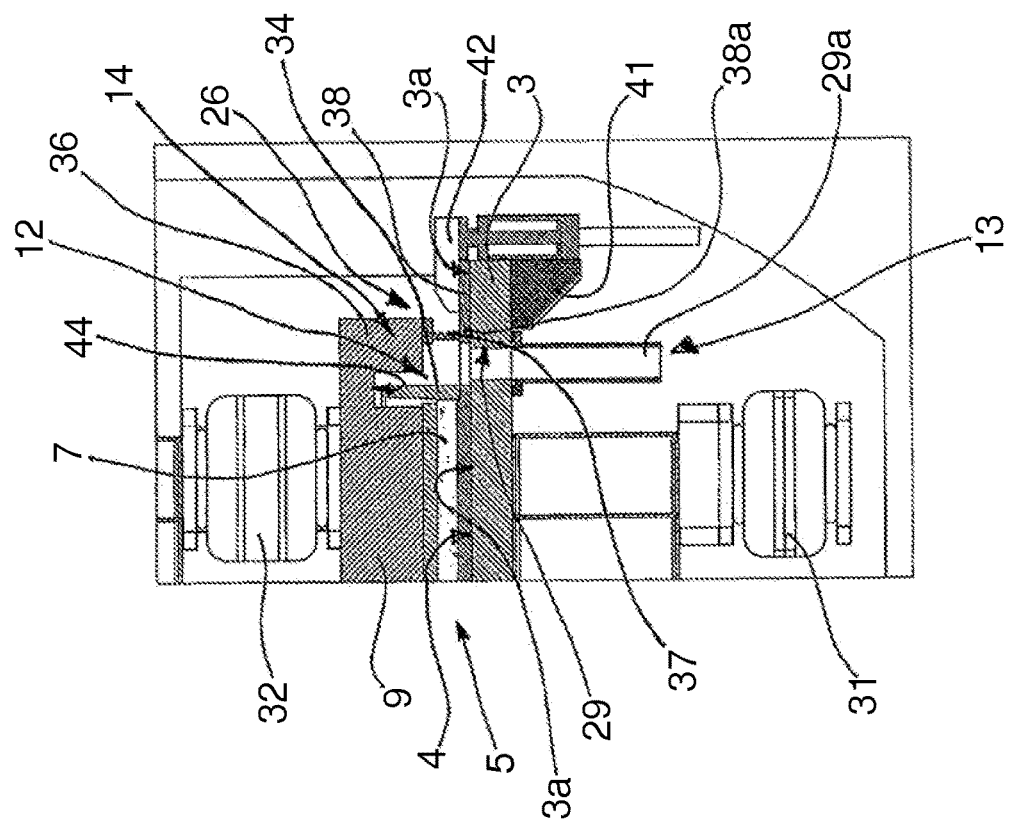
FIG. 11 is a detail of FIG. 10.
Figure 13:
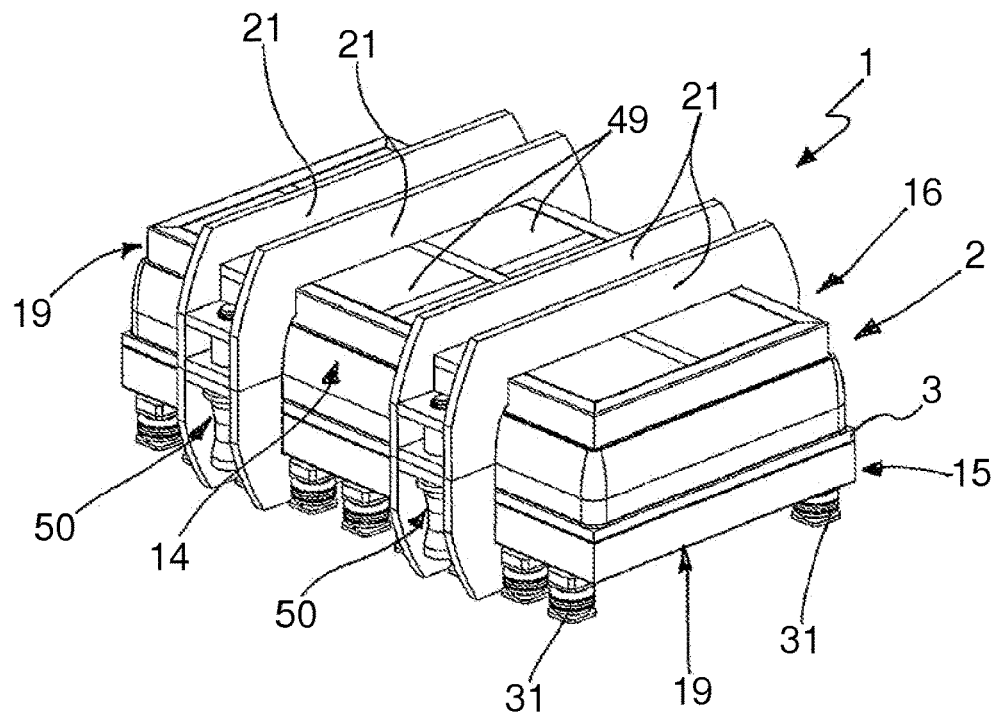
FIG. 13 is an axonometric view of another embodiment of the equipment according to the invention.
Figure 14:
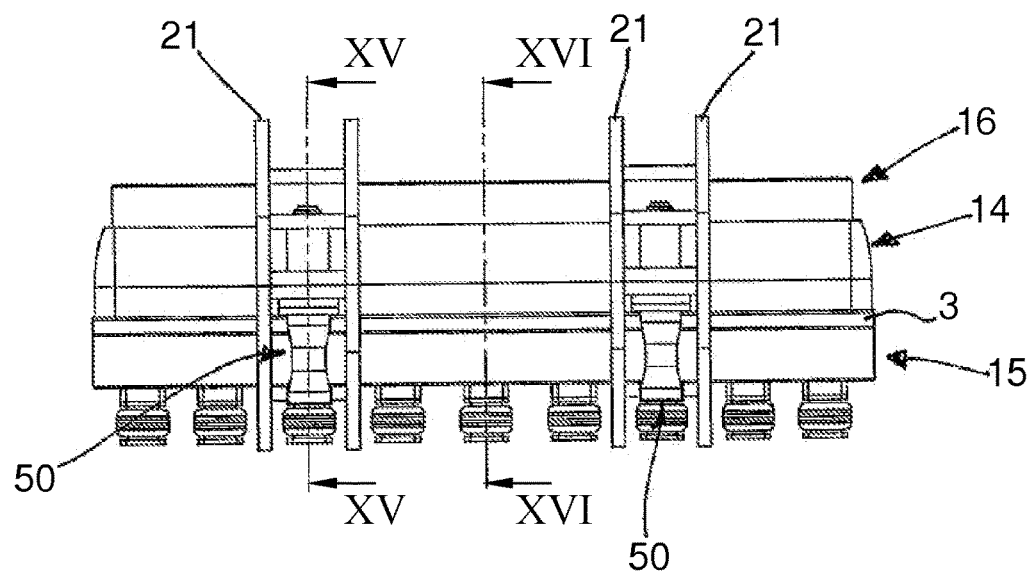
FIG. 14 is a side view of the equipment of FIG. 13.
Figure 15:
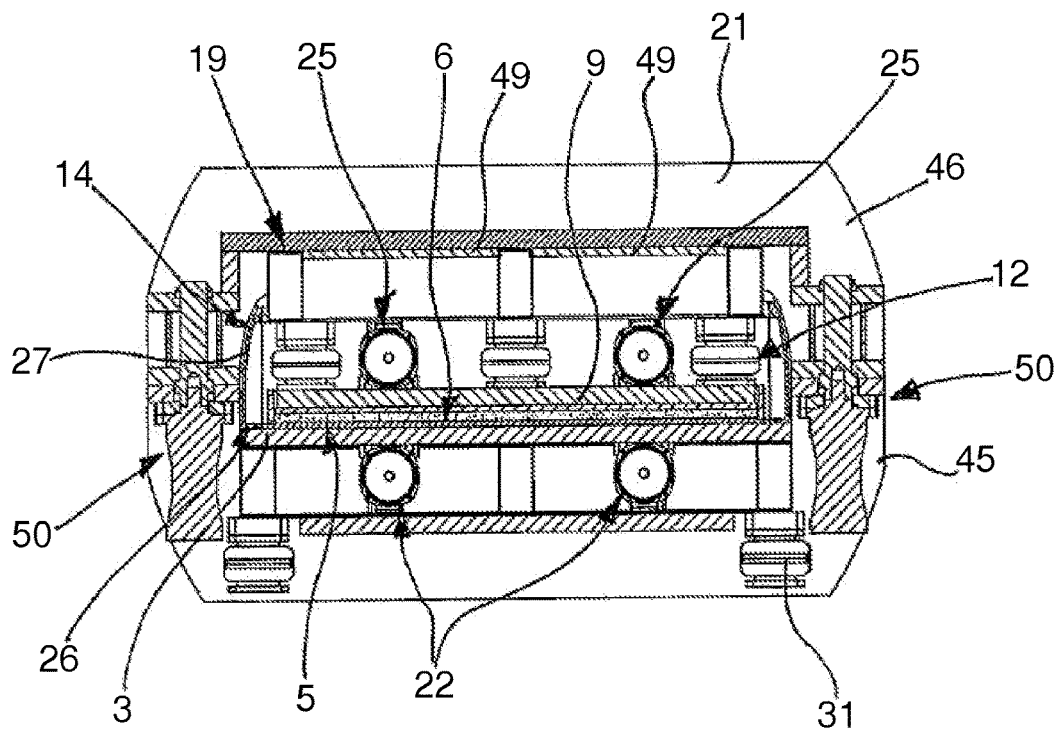
FIG. 15 is a cross-section of the equipment of FIG. 13 taken along the XV-XV plane of FIG. 14.
Figure 16:
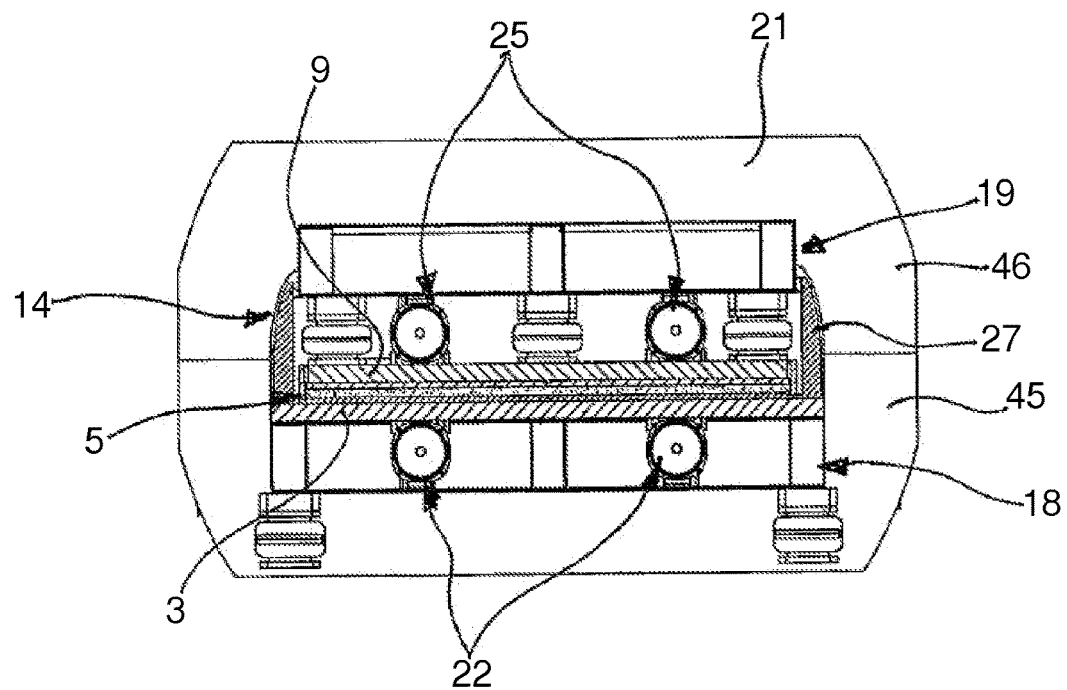
FIG. 16 is a cross-section of the equipment of FIG. 13 taken along the plane XVI-XVI of FIG. 14.
Figure 19:
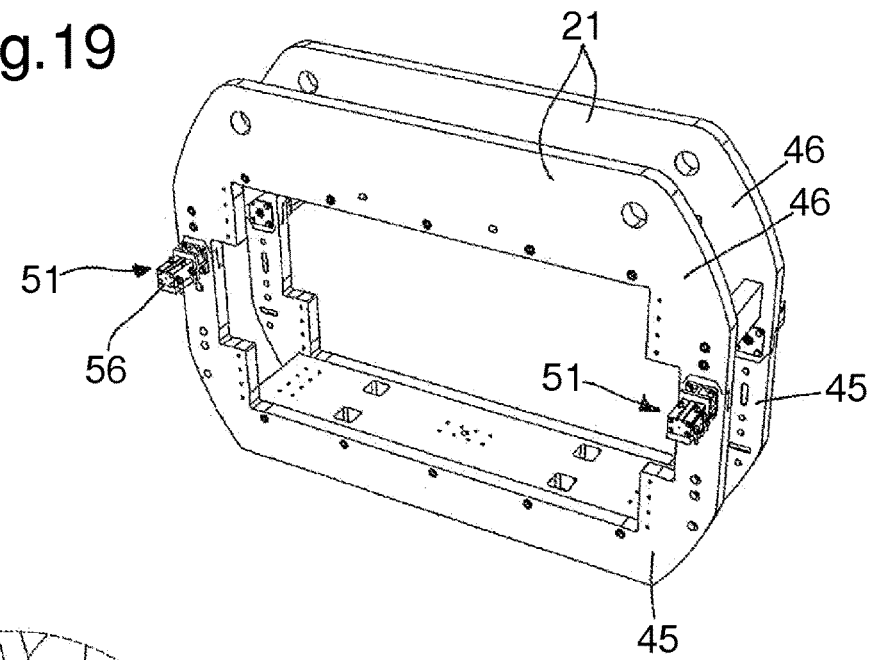
FIG. 19 is a perspective detailed view of the frame of the equipment of FIG. 13.
Figure 19A:
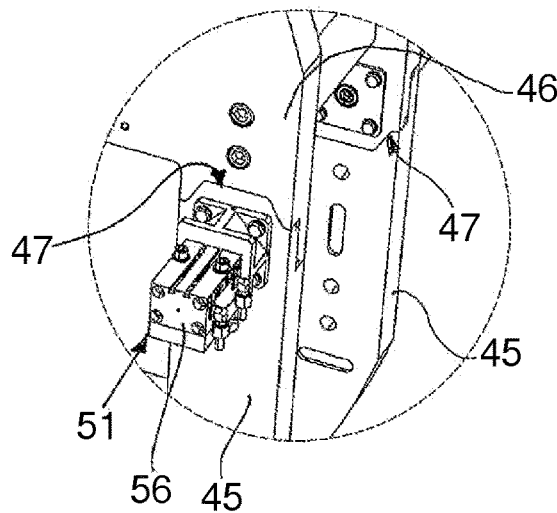
FIG. 19A is an enlargement of a detail of FIG. 19.

With reference, e.g., to FIG. 11, each of the first locking actuators 39 comprises a first clamp member 41 fixed to the lower face of the lower plate 3; the first clamp member 41 is locked together with the cylinder of a pneumatic actuator.

Furthermore, each of the second locking actuators comprises a second clamp member 42, locked together with the rod of the same pneumatic actuator.

Therefore, when the rod is completely inside the cylinder, the second clamp member 42 is in tightening position and abuts on the surround element 38, keeping the latter in sealed contact on the lower plate 3.

When the rod has come out of the cylinder, the second clamp member 42 is in open position with respect to the first clamp member 41, and such position corresponds to the upper position of the upper plate 9, and also of the upper closing element 14, wherein, that is, the chamber 12 is open and allows the loading/unloading of the mold 5.

Each of the second locking actuators 40 comprises a respective pneumatic cylinder with several rods (e.g. triple rod), fixed to the second platform 19 of the frame 2; such rods are connected to a small plate 43 (FIG. 7) which, when the rods have come out of the cylinder, abuts on the surround element 38.

The suction means 13 comprise a plurality of suction holes 29 made in the lower plate 3; more specifically, the suction holes 29 are made along the long sides of the equipment 1, outside the perimeter of the positioning zone 4 of the mold 5.

The suction holes 29 communicate with the respective ducts 29a and, through these, with a depressor, not shown in the illustrations.

Figure 10:
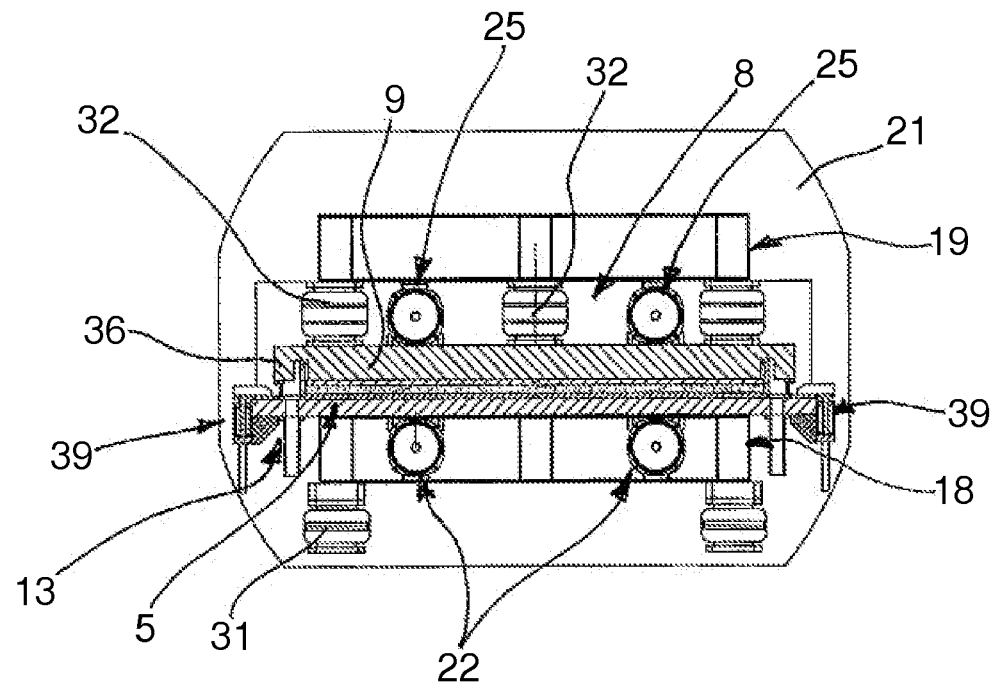
FIG. 10 is a cross-section of the equipment of FIG. 7 taken along the plane X-X of FIG. 8.
Figure 12:
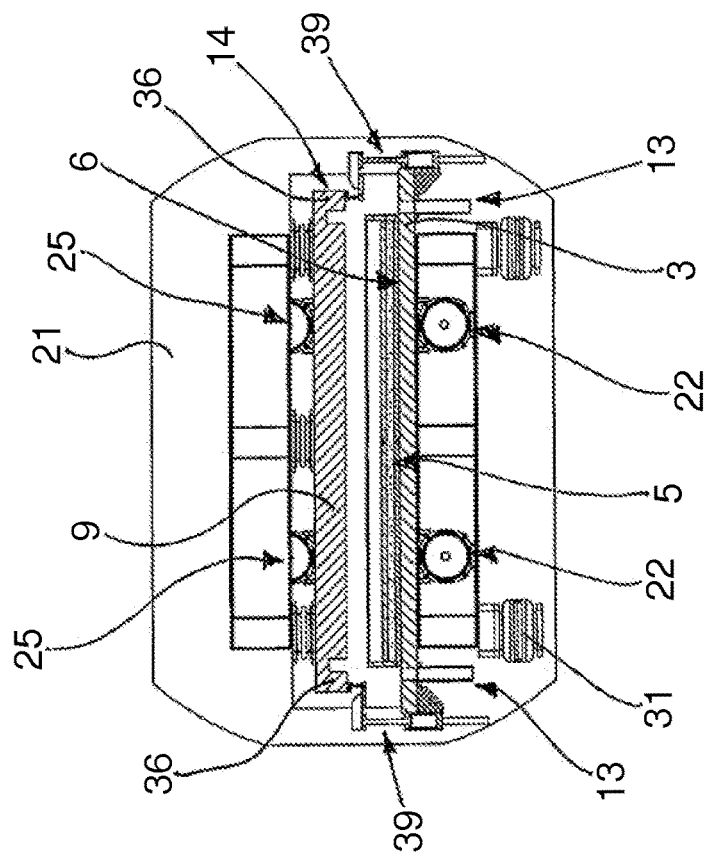
FIG. 12 is a cross-section of the equipment of FIG. 7 taken along the plane X-X of FIG. 7, with the upper plate in the upper position to allow taking the mold out.

As shown, for example, in FIGS. 10, 11, when the upper plate 9 is in the lower pressing position, an extremely small volume airtight chamber 12 is defined, concentrated essentially at the lateral walls 34 of the mold 5.

In fact, the perimeter edge 36 of the upper plate 9 is defined, in practice, by a perimeter groove 44 of the same upper plate 9, inside which are inserted, that is, the lateral walls 34 of the mold 5 when the upper plate 9 is in the lower position.

The solution referred to in this embodiment has reduced overall dimensions, compared to the previous one, especially in vertical direction; the pressing assembly 8 of the equipment 1 has, in fact, a much smaller size and weight.

Another embodiment of the equipment 1 according to the invention is shown in the FIGS. 13-20.

Unless otherwise described, and as shown in the tables of the drawings, this embodiment comprises all the features of the previous embodiments. This embodiment also differs from the previous ones in terms of the structure and conformation of the frame 2.

In fact, in this embodiment, the frame 2 comprises a lower portion 15 and an upper portion 16 movable with respect to one another in a direction orthogonal to the forming plane of the slabs.

More specifically, the lower portion 15 and the upper portion 16 are mobile the one to the other from a closed pressing position to an open position, in which they are mutually moved away and allow the insertion/removal of the mold 5. The conformation of the first platform 18, of the second platform 19 and of the annular elements 21 of the frame 2 is identical to that of the previous embodiments.

Nevertheless, each of the annular elements 21 comprises a first semi-element 45 and a second semi-element 46, which are mutually connected at their respective coupling surfaces 47.

To the first semi-element 45 is fixed the first platform 18, while to the second semi-element 46 is fixed the second platform 19.

In this embodiment, the upper closing element 14 comprises a bell-shaped body 27; such bell-shaped body 27 is fixed to the upper portion 16 of the frame 2. More specifically, the bell-shaped body 27 (equipped with its own gasket 26a) comprises a central opening 48, and is fixed to the second platform 19 at such central opening 48.

Since the purpose of the bell-shaped body 27 is to define the airtight chamber 12, upper slabs 49 are provided that close the openings of the second platform 19 provided between the central beam 20a and the crosspieces 20b.

The second vibrating means 25 are fixed to the upper face of the upper plate 9; in practice—and contrary to the previous embodiments—these are inside the airtight chamber 12.

According to one aspect of the invention, the frame 2 comprises lifting parts 50. The lifting parts 50 are adapted to shift the upper portion 16 sideways selectively with respect to the lower portion 15 between the above closed position and open position.

Furthermore, the frame 2 comprises selective locking parts 51 of the upper portion 16 with respect to the lower portion 15.

The lifting parts 50 comprise actuators of the hydraulic type or other suitable type.

In the embodiment shown in the illustrations, each of the lifting parts 50 (e.g., a total of four) comprises a respective cylinder 52 fixed to a first flange 53 locked together with at least one of the first semi-elements 45, and a rod 54, associated with the cylinder 52 and fixed to a second flange 55, the latter locked together with at least one of the second semi-elements 46.

Therefore, by operating the lifting parts 50 in the direction of the coming out of the rods 54, it is possible to achieve the moving away of the second semi-elements 46 compared to the first semi-elements 45, and therefore of the upper portion 16 with respect to the lower portion 15.

It is obvious that different types of lifting parts 50 can be used, without any restriction.

The selective locking parts 51 comprise linear actuators 56, locked together with the lower portion 15 of the frame 2.

The linear actuators 56 are, e.g., of the pneumatic type.

More specifically, the linear actuators 56 are locked together with the first semi-element 45 of each of the annular elements 21.

The above linear actuators 56 comprise respective rods 56a (with respective axes parallel to the forming plane) selectively insertable in respective coupling holes 56b provided in the upper portion 16 of the frame 2.

More specifically, the above coupling holes 56*b* are provided in the second semi-element 46 with each of the annular elements 21.

Figure 20:
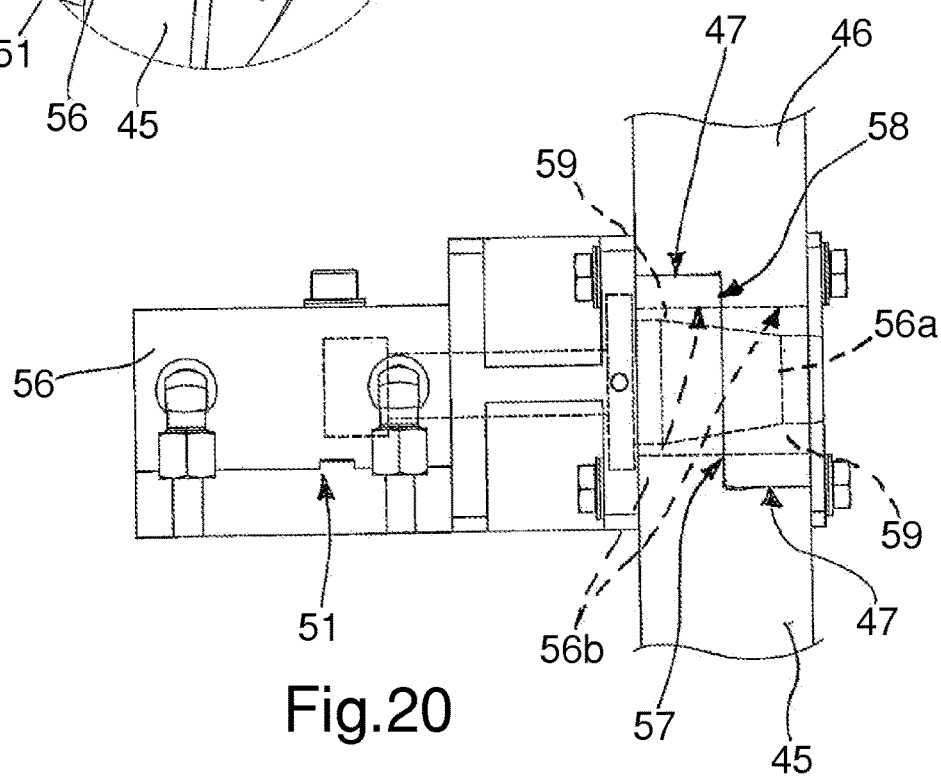
FIG. 20 is a side detailed view of the frame of the equipment of FIG. 13.

In order to obtain an optimal solution also from the point of view of the overall dimensions, the coupling surfaces 47 of the first semi-element 45 and of the second semi-element 46 are obtained by realizing respective portions with reduced thickness in the two semi-elements 45, 46; such portions with reduced thickness, as shown in the detail of FIG. 20, mutually interlock so as to ensure both support in a vertical direction and the presence of two mating surfaces 57, 58, parallel to the lifting direction, through which the aforementioned selective locking parts 51 can operate.

In practice, the rods 56*a* are made conical in shape, and in the coupling holes 56*b* respective conical bushes 59 are provided (as shown in FIG. 20), which ensure the correct and easy insertion of the rod 56*a*.

In practical operation, when it is necessary to load/unload the mold 5 in/from the positioning zone 4, the lifting parts 50 are activated so as to bring both the upper plate 9 and the bell-shaped body 27 to the upper position shown in FIG. 18.

The loading and unloading of the mold 5 is always done through the front or rear side of the equipment 1.

In this embodiment as well, the equipment 1 has a smaller vertical overall dimension than that of the embodiment in FIGS. 1-6.

Furthermore, the pressing assembly 8, or more generally the whole upper part of the equipment 1, is constructively simplified and comprises fewer components, better accessible and easier to disassemble.

This results in clear benefits from an economic and maintenance point of view. It has thus been ascertained how the invention achieves the intended objects. Solutions are provided to make the equipment for the production of slabs in mineral grits bound with resins more time and cost efficient.

The solutions shown are constructively simple and inexpensive; furthermore, they are much less cumbersome than known types of equipments, and this can also make it possible to have more installations in the same space.

The invention thus conceived is susceptible to numerous modifications and variations, all falling within the scope of the inventive concept. Furthermore, all details can be replaced by other technically equivalent elements.

In practice, the materials used, as well as the contingent shapes and sizes, can be any according to needs without because of this falling outside the scope of protection of the following claims.

The invention claimed is:

1. Equipment for the production of a slab from mineral grits bound with resins, the equipment comprising:
   a support frame,
   a lower plate locked together with said frame and comprising a positioning zone for a mold having a forming cavity open at a top thereof and adapted to contain a mix comprising materials for obtaining the slab,
   a pressing assembly comprising an upper plate movable with respect to said frame from an upper position and unloading said mold in and from said positioning zone, respectively, to a lower position for pressing said mix inside said forming cavity,
   vibrating means associated at least with said lower plate, and
   an airtight chamber communicating with suction means, the airtight chamber adapted to reduce pressure to a value lower than atmospheric pressure and containing said mold,
   wherein said chamber is interposed between said lower plate and an upper closing element opposite said lower plate, said upper closing element configured such that:
   an upper face of the upper plate has a number of reliefs determining lifting of the upper closing element to allow for loading and unloading the mold into the chamber; or
   the upper closing element comprises the perimeter edge of said upper plate.

2. Equipment according to claim 1, wherein said frame comprises a lower portion with which said lower plate is locked together and an upper portion associated with said lower portion in such a way as to define, between the upper and lower portions, an internal volume in which said chamber is housed.

3. Equipment according to claim 2, wherein said lower portion and said upper portion of said frame are movable with respect to one another in a direction orthogonal to the forming plane of the slab, from a closed pressing position to an open position in which they are mutually moved away from one another and allow for insertion and removal of said mold.

4. Equipment according claim 1, wherein said upper closing element comprises perimeter sealing means on the upper surface of said lower plate so as to define said airtight chamber.

5. Equipment according to claim 3, wherein said upper closing element comprises a bell-shaped body having a concavity facing the lower plate, said perimeter sealing means comprising a gasket housed in a respective groove defined in the lower edge of said bell-shaped body.

6. Equipment according to claim 5, comprising first vibrating means associated with said lower plate and second vibrating means associated with said pressing assembly, wherein said pressing assembly comprises a plurality of upper appendages which depart from said upper plate and a table, the table fixed on said upper appendages and on which said first vibrating means are fixed, said bell-shaped body being associated in a sliding manner with said upper appendages.

7. Equipment according to claim 6, wherein said pressing assembly comprises a plurality of armored bellows which are fitted along said upper appendages and are interposed between an upper face of said bell-shaped body and a lower face of said table.

8. Equipment according to claim 1, wherein said upper closing element comprises the perimeter edge of said upper plate, the perimeter edge of said upper plate extending outside the perimeter of said positioning zone.

9. Equipment according to claim 8, comprising perimeter sealing means comprising an armored bellows connected to said perimeter edge of said upper plate, and a surround element connected to said armored bellows, said surround element being adapted to abut and seal on the upper surface of said lower plate.

10. Equipment according to claim 9, wherein said perimeter sealing means comprises a plurality of locking actuators adapted to keep said surround element abutted and sealed on said upper surface of said lower plate.

11. Equipment according to claim 1, comprising first vibrating means associated with said lower plate and second vibrating means associated with said pressing assembly.

12. Equipment according to claim 11, comprising first damping elements associated with a lower portion of said frame and adapted to absorb vibrations generated by the equipment so as to prevent these vibrations from being transferred to the ground.

13. Equipment according to claim 12, comprising second damping elements which are placed between an upper portion of said frame and said pressing assembly, the second damping elements adapted to absorb the vibrations generated by the equipment so as to prevent these vibrations from being transferred to said upper portion.

14. Equipment according to claim 1, wherein the lower plate is one of a plurality of lower plates each comprising a respective one of said positioning zones, wherein the mold is one of a plurality of molds each comprising a respective one of said forming cavities, wherein the pressing assembly is one of a plurality of pressing assemblies each comprising a respective one of said upper plates, and wherein the slab is one of a plurality of slabs each formed by the equipment from mineral grits bound with resins.

\* \* \* \* \*